(12) United States Patent
Xin

(10) Patent No.: US 7,254,307 B2
(45) Date of Patent: Aug. 7, 2007

(54) FIBER BREAKOUT SYSTEM

(75) Inventor: Xin Xin, Liberty Lake, WA (US)

(73) Assignee: Telect Inc., Liberty Lake, WA (US)

( * ) Notice: Subject to any disclaimer, the term of this patent is extended or adjusted under 35 U.S.C. 154(b) by 0 days.

(21) Appl. No.: 11/259,571

(22) Filed: Oct. 26, 2005

(65) Prior Publication Data
US 2006/0275006 A1  Dec. 7, 2006

Related U.S. Application Data

(60) Provisional application No. 60/687,628, filed on Jun. 3, 2005.

(51) Int. Cl.
*G02B 6/00* (2006.01)
(52) U.S. Cl. .................. 385/134; 385/135
(58) Field of Classification Search ........... 385/134, 385/135
See application file for complete search history.

(56) References Cited

U.S. PATENT DOCUMENTS

| | | | |
|---|---|---|---|
| 4,664,471 A * | 5/1987 | Mignien et al. | 385/135 |
| 4,773,729 A * | 9/1988 | Mignien | 385/135 |
| 4,824,196 A | 4/1989 | Bylander | |
| 5,100,221 A | 3/1992 | Carney et al. | |
| 5,323,480 A | 6/1994 | Mullaney et al. | |
| 5,363,466 A | 11/1994 | Milanowski et al. | |
| 5,956,449 A | 9/1999 | Otani et al. | |
| 6,009,224 A | 12/1999 | Allen | |
| 6,322,378 B1 * | 11/2001 | Auclair | 439/99 |
| 6,360,050 B1 | 3/2002 | Moua et al. | |
| 6,418,266 B1 | 7/2002 | Vitantonio | |
| 6,434,316 B1 * | 8/2002 | Grois et al. | 385/139 |
| 6,438,310 B1 | 8/2002 | Lance et al. | |
| 6,575,640 B2 * | 6/2003 | Connelly et al. | 385/69 |
| 6,591,051 B2 * | 7/2003 | Solheid et al. | 385/134 |
| 6,633,717 B1 | 10/2003 | Knight et al. | |
| 6,870,734 B2 | 3/2005 | Mertesdorf et al. | |
| 6,925,241 B2 | 8/2005 | Bohle et al. | |
| 7,054,536 B2 * | 5/2006 | Sun | 385/137 |
| 7,102,884 B2 | 9/2006 | Mertesdorf et al. | |
| 2003/0206704 A1 * | 11/2003 | Lee et al. | 385/103 |
| 2004/0057691 A1 * | 3/2004 | Doss et al. | 385/134 |
| 2004/0175090 A1 | 9/2004 | Vastmans et al. | |
| 2005/0111809 A1 | 5/2005 | Glraud et al. | |
| 2005/0129379 A1 | 6/2005 | Reagan et al. | |

OTHER PUBLICATIONS

Three photographs of a bracket made by Pirelli Cable Corporation, at least as early as Sep. 30, 2004, 1 page.
Nexans, "Cable fixing Device D.E.P. Linx Notice d'Installation/Installing practice", Sep. 25, 2001, 2 pages.
ADC Telecommunications Inc. enclosure displayed at the International Engineering Consortium (IEC) SUPERCOMM Conference, held in Chicago, IL, Jun. 6-9, 2005.

* cited by examiner

*Primary Examiner*—Ellen E. Kim
(74) *Attorney, Agent, or Firm*—Lee & Hayes, PLLC

(57) ABSTRACT

A breakout kit is adapted to hold a cable by engaging three different layers of the cable, including an interior layer of the cable, an exterior of the cable, and an intermediate layer of the cable which is between the interior layer and the exterior layer.

27 Claims, 4 Drawing Sheets

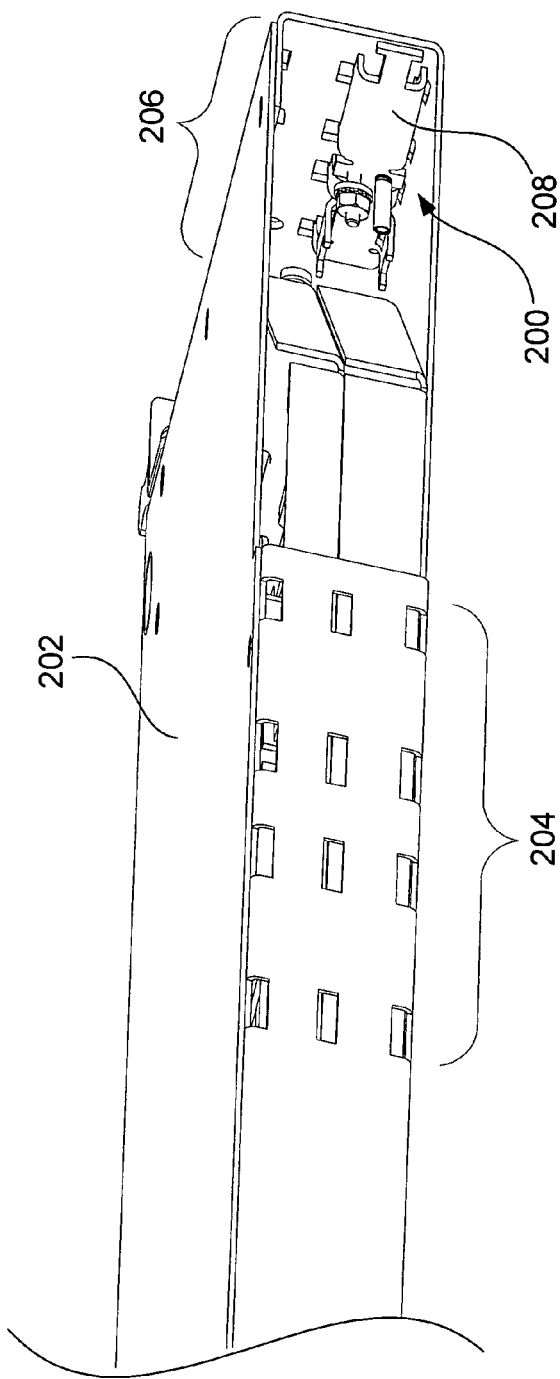
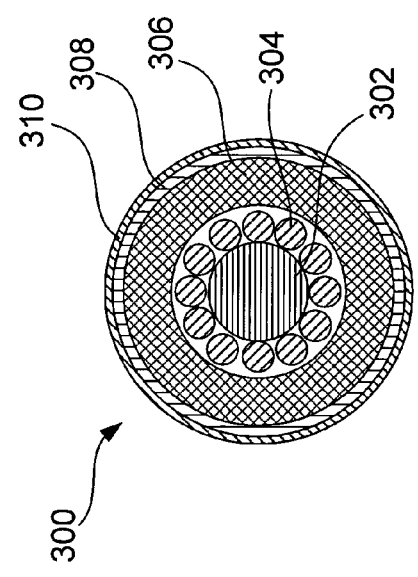
FIG. 2B
FIG. 3

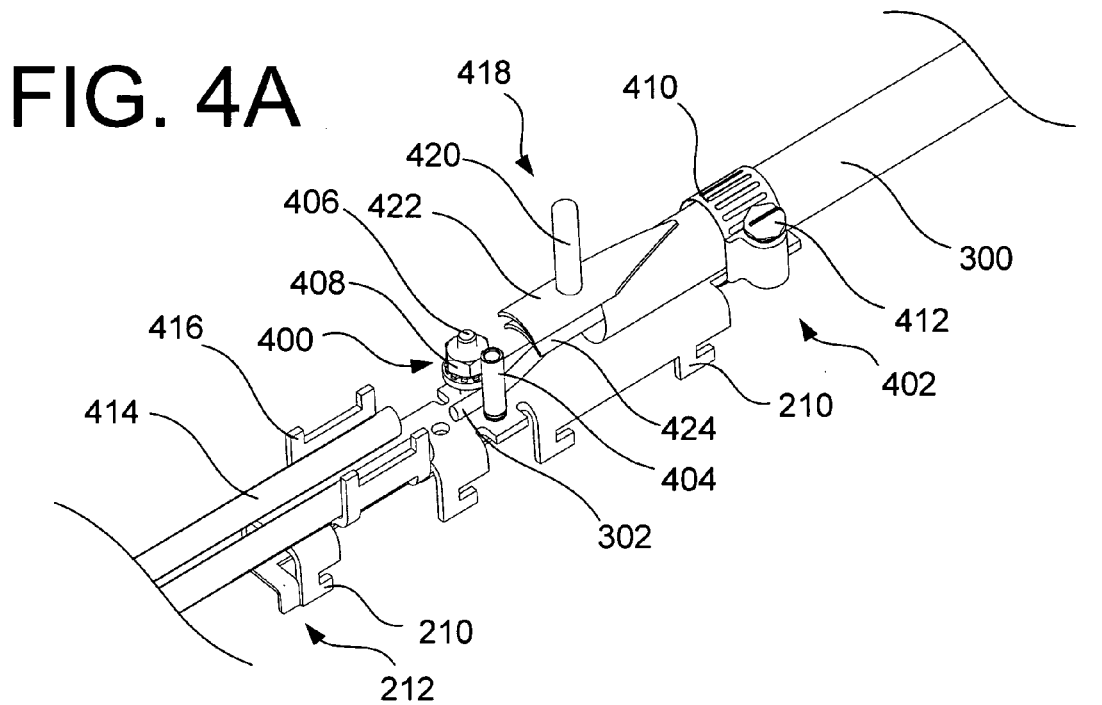
FIG. 4A
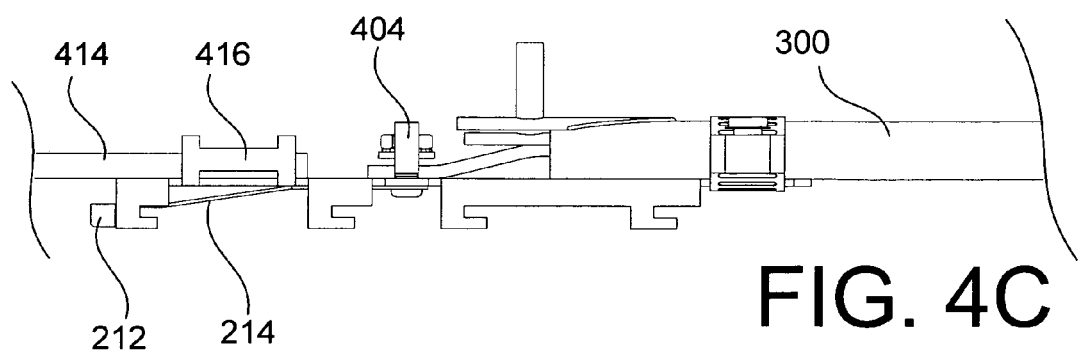
FIG. 4B
FIG. 4C

FIBER BREAKOUT SYSTEM

RELATED APPLICATIONS

This application claims the benefit of U.S. Provisional Application No. 60/687,628, filed Jun. 3, 2005, which is incorporated by reference herein.

TECHNICAL FIELD

The following disclosure relates generally to systems for managing and organizing fibers, such as optical fibers.

BACKGROUND

Optical fibers can be used to transmit large volumes of data and voice signals over relatively long distances, with little or no signal degradation. For this reason, optical fibers have become widely used in the telecommunication field. As the use of optical fibers has increased, new systems have been developed for managing and organizing larger numbers of optical fibers.

For example, typical optical fiber management systems include cable management structures for storing the fibers or connecting the fibers to one or more other fibers and/or fiber optic devices, such as attenuators, connectors, switches, multiplexers, splitters/combiners, or splices. Such fiber management systems often include one or more rack units mounted to a wall or to an equipment rack. One or more outside fiber cables enter the telecommunications facility and are fed to the rack units. The outside fiber cables include a plurality of bundled individual optical fibers, which are separated and routed to other optical fibers or optical devices in the rack units. However, conventional systems do not adequately secure the outside fiber cables to the rack units. As a result, individual fibers may be damaged if, for example, someone pulls on the outside fiber cables.

In addition, conventional systems typically require the outside fiber cables to be secured to the rack units at a single entry point of the rack unit. This often requires the outside fiber cables to be bent unnecessarily to reach the entry point of the rack unit.

SUMMARY

Breakout kits for holding cables and fiber management systems are disclosed. Breakout kits are devices that can be used to securely hold one or more cables of, for example, a fiber management system.

In one aspect, a breakout kit is adapted to hold a cable by engaging three different layers of the cable, including an interior layer of the cable, an exterior of the cable, and an intermediate layer of the cable which is between the interior layer and the exterior layer. Holding the cable in this manner minimizes the likelihood that it will be accidentally dislodged from the breakout kit.

In another aspect, a breakout kit has mounting feet protruding from a body of the breakout kit for mounting the breakout kit to a component of a telecommunications infrastructure, rack, cabinet, or other structural element. The breakout kit also includes a locking mechanism for locking the breakout kit in place when mounted.

BRIEF DESCRIPTION OF THE DRAWINGS

The detailed description refers to the accompanying figures. In the figures, the left-most digit(s) of a reference number identifies the figure in which the reference number first appears. The use of the same reference numbers in different figures indicates similar or identical items.

FIG. 2B is an enlarged, rear perspective view of the rack unit of FIG. 1, showing a breakout kit mounted to the rack unit at a second mounting position.

FIG. 3 is a cross-sectional view of an exemplary fiber cable that can be held by the breakout kit of FIGS. 2A and 2B.

FIG. 4A is a perspective view of the breakout kit of FIGS. 2A and 2B, with a fiber cable coupled thereto.

FIG. 4B is a plan view of the breakout kit of FIGS. 2A and 2B, with a fiber cable coupled thereto.

FIG. 4C is a side view of the breakout kit of FIGS. 2A and 2B, with a fiber cable coupled thereto.

DETAILED DESCRIPTION

This disclosure is directed to implementations including fiber management systems and components thereof, such as breakout kits for holding cables. The implementations are described in the context of a rack-mounted system for managing optical fibers in a telecommunications infrastructure. However, the implementations described herein may be used in other environments and are applicable to other contexts. For example, the apparatuses need not be mounted to a rack, and may, for example, be cabinet-mounted, wall-mounted, free standing, or the like. In addition, the apparatuses may be used to manage fibers other than optical fibers, such as wires, Ethernet cables, coaxial cables, and/or other signal carrying fibers, and may be used in any environment in which such fibers are used.

Fiber Management System

Figure 1:
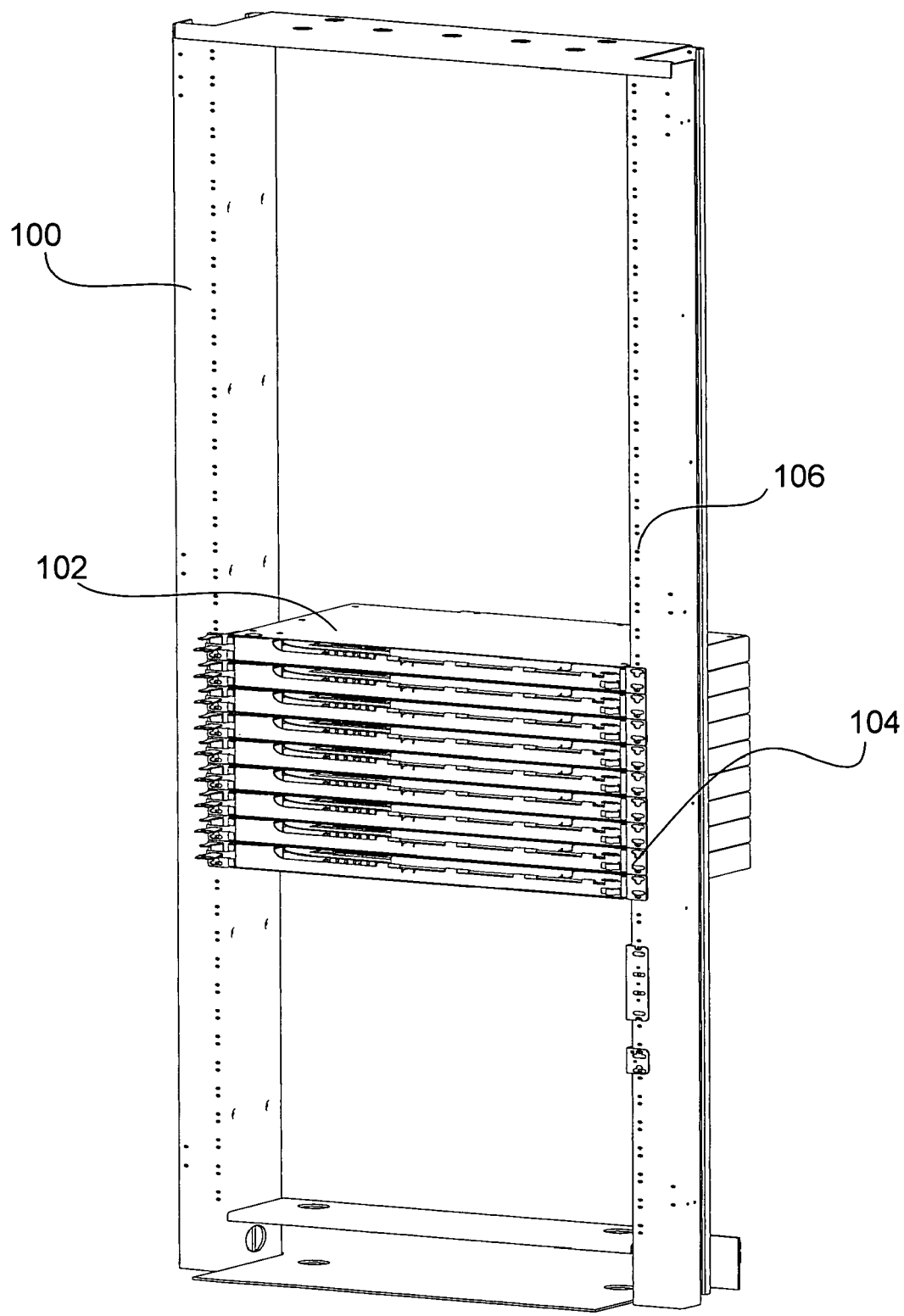
FIG. 1 is perspective view of one exemplary fiber management apparatus, including a rack with a plurality of rack units mounted thereto.

FIG. 1 illustrates a conventional free standing rack 100, on which rack units 102 are mounted. The rack units 102 are attached via brackets 104 to mounting holes 106 in the vertical sides of the rack 100.

The rack 100 shown in FIG. 1 is typical of those used by, for example, telecommunications companies to organize, route, distribute, hold, or otherwise manage incoming and outgoing optical fibers in a telecommunications facility. Generally, one or more fiber cables (not shown in this figure) enter the telecommunications facility and are routed to the rack units 102. As discussed in more detail below, each fiber cable includes a plurality of individual optical fibers, which are separated and routed to other optical fibers and/or optical devices in the rack units 102. In conventional systems, the fiber cables often are not securely fastened to the rack units. As a result, the fiber cables can be dislodged from the rack units accidentally, which might damage the individual optical fibers. Implementations described herein remedy this problem by securely holding the fiber cables in place by one or more breakout kits (also not shown in this figure), as discussed in more detail below with reference to FIGS. 2A-4C.

In large scale applications, such as in a regional telecommunications carrier for an urban area, whole rooms might be filled with racks similar to the one shown in FIG. 1. The likelihood that a fiber cable will be accidentally pulled from a rack unit increases with the number of incoming fiber cables.

Breakout Kit

Figure 2A:
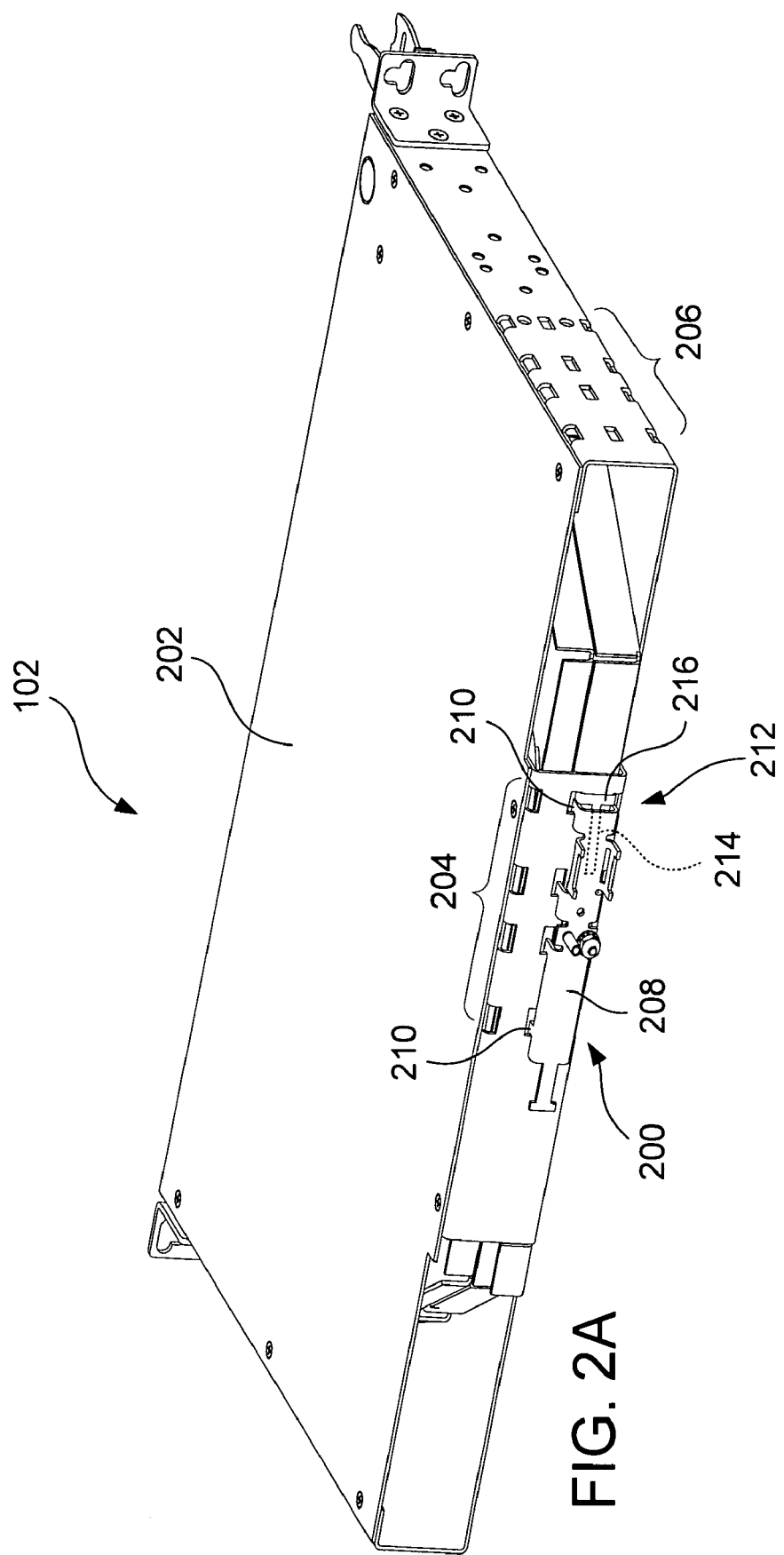
FIG. 2A is a rear perspective view of the rack unit of FIG. 1, showing a breakout kit mounted to the rack unit at a first mounting position.

FIGS. 2A and 2B show an exemplary breakout kit 200 mounted to a housing or chassis 202 of the rack unit 102. In these figures, the fiber cable has been omitted for clarity. The attachment of the fiber cable to the breakout kit is described below with reference to FIGS. 4A-4C.

While the chassis 200 is shown as being a generally rectangular enclosure, having substantially planar top, bottom, side, and back surfaces, numerous other chassis configurations are also possible. By way of example, one or more of the sides of the chassis might be omitted or have a different shape, the chassis could be an open framework with no sides at all, or the chassis could simply include a bracket with no framework or sides at all. In another alternative, the chassis could be omitted entirely, with the breakout kit 200 being connectable directly to the rack 100, a cabinet, or other supporting structure.

The breakout kit 200 can be mounted to the chassis 202 in a plurality of different positions, including a first position shown in FIG. 2A in which the breakout kit 200 is coupled to a first set of mounting slots 204 on the outside-back surface of the chassis 202, and a second position shown in FIG. 2B in which the breakout kit 200 is coupled to a second set of mounting slots 206 on an inside-side surface of the chassis 202. In practice, one or more breakout kits 200 can be coupled to each chassis 202, depending on the number of optical fibers and/or optical devices housed in the chassis 202. While only two mounting positions are shown, it should be understood that various additional or alternative mounting positions could be provided by forming additional sets of mounting slots or other mounting features at any desired location in the chassis 202. This flexibility allows a user to couple as many fiber cables to each chassis 202 as desired, in the location and orientation desired, to minimize unnecessary bends in the fiber cables and optical fibers.

The breakout kit 200 comprises an elongated, substantially planar body 208, with eight L-shaped mounting feet 210 protruding therefrom. Four of the mounting feet 210 are spaced along and extend from each edge of the body 208. The mounting feet 210 engage the mounting slots 204 or 206 in the chassis 202. While each breakout kit 200 is described as having eight mounting feet 210, in practice breakout kits may have any number of mounting feet. Also, while the mounting feet 210 are described as being L-shaped, mounting features of other shapes may also advantageously be used. Alternatively or additionally, the breakout kit could be coupled to the chassis by one or more other mounting means, such as screws, rivets, interference fits, snap fits, latches, adhesive, hook-and-loop fasters, and the like.

The breakout kit 200 is locked in place on the chassis 202 by a locking mechanism 212. The locking mechanism 212 includes an elongated leaf spring 214 extending from a mounting side of the body 208 (the back side in FIG. 2A) with an enlarged abutment member 216 located at a distal end of the leaf spring 214. (The components of the locking mechanism 212 can be better seen with reference to FIG. 4C.) The leaf spring 214 biases the locking mechanism 212, such that when the mounting feet 210 are inserted in the mounting slots 204 or 206 and the breakout kit 200 is slid toward the locked position (the direction of the arrow in FIG. 2A), the abutment member 216 fits into the mounting slot behind one or more of the mounting feet 210 and prevents the breakout kit 200 from being slid back in the opposite direction. To remove the breakout kit 200, a user pulls out on the locking mechanism 212 to dislodge the abutment member 216 from the mounting slot 204 or 206.

FIG. 3 shows an exemplary fiber cable 300 usable with the implementations described herein. The fiber cable 300 includes a central core or strength member 302 having a perimeter, around which are positioned twelve individual optical fibers 304. A layer of fibrous material 306, such as Kevlar fiber, encircles the optical fibers 304 and the center strength member 302, followed by a layer of metal sheeting 308. The metal sheeting 308 serves as a ground, by which the cable 300 can be electrically grounded. An outer protective jacket 310 encircles the metal sheeting 308 and forms the exterior of the cable 300. The individual fibers 304 of the cable 300 are separated or broken-out at the breakout kit 200 for routing to other optical fibers and/or optical devices. The cable shown in FIG. 3 is one exemplary cable which may be used with implementations described herein. However, it should be understood that numerous other types of cables or fibers can also be used, including cables having more, less, and/or different layers than the fiber cable shown in FIG. 3. For example, the cable could be a coaxial cable, an Ethernet cable, wires, or other signal carrying fibers.

FIGS. 4A-4C show how the cable is held by the breakout kit and how the individual fibers 304 are broken-out. The individual optical fibers 304 are only shown in FIG. 4B for clarity. The fiber cable 300 is held to the breakout kit 200 by engagement with three different parts of the fiber cable 300. Specifically, the breakout kit 200 includes a first clamp 400 for clamping the central strength member 302 of the fiber cable 300 to the body 208, a second clamp 402 for clamping the exterior protective jacket 310 of the fiber cable 300 to the body 208, and a standoff 404, around which an intermediate fibrous layer 304 of the fiber cable 300 is wrapped. The fibrous layer is not shown in FIGS. 4A-4C for clarity, but would simply be separated from the other parts of the fiber cable 300 and wrapped around the standoff 404.

The first clamp 400 comprises a stud 406 protruding from the body 208, with a nut 408 and/or washer threaded on the stud 406 to clamp the center strength member 302 of the fiber cable 300. The stud 406 may be attached the body 208 by spot welding, press-fitting, riveting, threaded engagement, or other conventional mounting techniques. The nut may be a hex-nut, a lock-nut, a wing-nut, and/or any other suitable type of threaded fastener that could be used to apply a holding force to a portion of the fiber cable 300. Of course, numerous other suitable types of clamps will be apparent to one of ordinary skill in the art, such as a smooth post with a one-way sliding lock ring, an elastic band (of metal, plastic, rubber, or the like), a wire tie (e.g., a zip-tie), a ratcheting band or strap, one or more elements that can be deformed or crimped, or the like.

The second clamp 402 comprises a band 410 that wraps around a narrowed portion of the body 208 and around the exterior protective jacket 310 of the fiber cable 300. The second clamp 402 includes a mechanism 412 to tighten the band 410 so as to secure the exterior of the fiber cable 300 to the body 208. One suitable example of the second clamp 402 is a conventional hose clamp, with either a threaded tightening mechanism as shown or with a preloaded clamping bias. Of course, numerous other clamping means could instead be used to hold the exterior of the fiber cable 300 to the body 208, such as those described above with reference to the first clamp 400, as well as other conventional clamping devices.

The standoff 404 comprises a substantially cylindrical post protruding from the body 208 adjacent, and substantially parallel, to the stud 406 of the second clamp. The fibrous part 306 of the fiber cable 300 can be wrapped around the standoff 404 and clamped in place along with the center strength member 302 by the first clamp 400. The standoff 404 can be attached to the body by any of the means mentioned above with respect to the stud 406. While the standoff 404 is shown and described as being a substantially cylindrical post extending substantially perpendicularly from the body 208, numerous other shapes and orientations of the standoff 404 could be employed.

This combination of three different holding structures provides a very effective connection of the fiber cable 300 to the breakout kit 200 and, hence to the chassis 202.

The individual fibers 304 of the fiber cable 300 are broken-out and fed into one or more sections of bend-limiting tubing 414 for routing to one or more other optical fibers and/or optical devices. The sections of bend limiting tubing 414 are secured to the breakout kit 200 by tabs 416, which can be crimped down onto the bend-limiting tubing 414 to secure the bend limiting tubing 414 to the body 208. The tabs 416 are shown in FIGS. 4A-4C in a new condition, before being crimped onto the bend-limiting tubing 414. Of course, numerous other clamping means could instead be used to hold the bend-limiting tubing 414 to the body 208, such as those described above with reference to the first and second clamps 400 and 402, as well as other conventional clamping means.

While the fiber cable 300 and the bend-limiting tubing 414 are securely held to the breakout kit 200, the individual optical fibers 304 are not secured by the breakout kit 200. Rather, the optical fibers 304 are routed freely around the first clamp 400 and the standoff 404 and into the bend-limiting tubing 414. Thus, there is no danger that the optical fibers 304 will be damaged by being clamped. Also, because the fiber cable 300 and the bend-limiting tubing 414 are secured to the body 208 of the same breakout kit 200, it is unlikely that the optical fibers 304 will be damaged by the fiber cable 300 being accidentally pulled away from the bend-limiting tubing 414.

While different structures are described for holding different portions of the fiber cable 300 and bend-limiting tubing 414, it will be apparent to one of ordinary skill in the art that any number of one or more holding devices could be used to hold one or more parts of a fiber cable. Moreover, numerous other holding structures will be apparent to one of ordinary skill in the art and could be used alone or in combination with one or more of the holding devices described herein.

A grounding mechanism 418 is connected to the fiber cable 300 to electrically ground the fiber cable 300. The grounding mechanism 418 comprises a grounding post 420, which connects via a grounding wire or strap (not shown) to an electrical ground of the chassis, rack, cabinet, or other structure of the fiber management system. The grounding post 420 extends through an upper plate 422 and a lower plate 424. The grounding post 418 is in electrical communication with at least the lower plate 424. The lower plate 424 is inserted between the metal sheeting layer 308 and the fibrous later 306, such that the lower plate 424 contacts and is in electrical communication with the metal sheeting layer 308. The upper plate 422 fits over exterior protective jacket 310 and, together with the lower plate 424, clips the grounding mechanism 418 to the fiber cable 300. Alternatively, as the grounding mechanism, an electrode could be inserted in contact with the metal sheeting layer and the electrode connected to the grounding wire or strap, or an electrically conductive spike could be forced through the protective jacket 310 of the fiber cable 300 into contact with the metal sheeting layer 308 of the fiber cable and the spike connected to the grounding wire or strap. Of course, numerous other suitable grounding mechanisms will be apparent to those of ordinary skill in the art.

The components of the fiber management system and breakout kits can be made of any material having the desired combination of strength, cost, weight, electrical conductivity, and other material properties, and can be made by conventional manufacturing and assembling processes. Several suitable materials include, for example, metals, plastics, polymers, composites, and the like.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A breakout kit for holding a fiber cable, the breakout kit comprising:
   a body;
   a first clamp for clamping an interior layer of the fiber cable to the body;
   a second clamp for clamping an exterior layer of the fiber cable to the body; and
   a standoff on the body around which an intermediate layer of the fiber cable is wrapped, the intermediate layer being between the interior layer and the exterior layer.

2. The breakout kit of claim 1, further comprising a plurality of mounting feet protruding from the body for mounting the breakout kit to a chassis.

3. The breakout kit of claim 2, further comprising a locking mechanism for locking the breakout kit in place on the chassis, the breakout kit being removable from the chassis by actuating the locking mechanism.

4. A fiber management system comprising a breakout kit according to claim 1 removably coupled to a chassis.

5. The fiber management system of claim 4, wherein the chassis comprises a plurality of mounting slots configured for engaging a plurality of mounting feet of the breakout kit, for removably mounting the breakout kit in at least two different locations on the chassis.

6. A fiber management system comprising a breakout kit according to claim 1 coupled to a component of a telecommunications infrastructure.

7. The breakout kit of claim 1, wherein the second clamp comprises a band that wraps around a portion of the body and around the exterior of the fiber cable and includes a mechanism to tighten the band to clamp the exterior of the fiber cable to the body.

8. The breakout kit of claim 7, wherein the second clamp comprises a band that wraps around a portion of the body and around the exterior of the fiber cable and includes a mechanism to tighten the band to clamp the exterior of the fiber cable to the body.

9. The breakout kit of claim 1, wherein the standoff comprises a substantially cylindrical post protruding from the body.

10. The breakout kit of claim 1, wherein the first clamp comprises a stud protruding from the body, with a nut threaded on the stud to clamp the interior layer of the cable, and wherein the standoff comprises a substantially cylindrical post protruding from the body adjacent, and substantially parallel, to the stud.

11. The breakout kit of claim 1, wherein the intermediate layer comprises a fibrous material, and wherein the fibrous material is wrapped around the standoff more than once.

12. The breakout kit of claim 1, wherein the fiber cable includes a plurality of optical fibers, and wherein the optical fibers are not directly clamped to the body and are held only by the interior layer, the exterior layer, and the intermediate layer.

13. The breakout kit of claim 1, wherein the fiber cable includes a plurality of optical fibers, and wherein the optical fibers are routed freely around the first clamp and the standoff into one or more sections of tubing.

14. A breakout kit comprising a body that holds a fiber cable by engagement with an interior layer of the fiber cable, by engagement with an exterior of the fiber cable, and by engagement with an intermediate layer of the fiber cable which is between the interior layer and the exterior layer, wherein the intermediate layer of the fiber cable is wrapped at least once around a standoff of the breakout kit.

15. The breakout kit of claim 14, wherein the cable is a fiber cable comprising a plurality of optical fibers, and wherein the exterior of the cable comprises a protective jacket, the interior layer comprises a central strength member, and the intermediate layer comprises fibrous material.

16. The breakout kit of claim 14, wherein the interior layer of the fiber cable is held to the body by a first clamp of the breakout kit.

17. The breakout kit of claim 16, wherein the exterior layer of the fiber cable is held to the body by a second clamp of the breakout kit.

18. A fiber management system comprising a breakout kit according to claim 14 removably coupled to a chassis.

19. A fiber management system comprising a breakout kit according to claim 14 coupled to a component of a telecommunications infrastructure.

20. A breakout kit adapted for holding a fiber cable of a telecommunications system, the fiber cable comprising an interior layer, an exterior layer, an intermediate layer, and a plurality of optical fibers, and the breakout kit comprising:
   a body;
   a plurality of mounting feet protruding from the body for mounting the breakout kit to a component of a telecommunications infrastructure;
   a locking mechanism for locking the breakout kit in place when mounted on the component of the telecommunications infrastructure;
   a first clamp clamping the interior layer of the fiber cable to the body;
   a second clamp clamping the exterior layer of the fiber cable to the body; and
   a standoff on the body around which the intermediate layer of the fiber cable is wrapped, the intermediate layer being between the interior layer and the exterior layer;
   wherein each of the plurality of optical fibers is routed freely around the first clamp and the standoff.

21. The breakout kit of claim 20, wherein each of the mounting feet comprises a substantially L-shaped tab protruding from the body.

22. The breakout kit of claim 20, wherein the locking mechanism comprises a spring having an abutment member at one end thereof.

23. The breakout kit of claim 20, wherein the plurality of mounting feet includes eight mounting feet.

24. The breakout kit of claim 20, further comprising a retainer for retaining a piece of tubing on the breakout kit relative to the fiber cable.

25. The breakout kit of claim 20, wherein the first clamp comprises a stud protruding from the body, with a nut threaded on the stud to clamp the interior layer of the fiber cable, and wherein the standoff comprises a substantially cylindrical post protruding from the body adjacent, and substantially parallel, to the stud.

26. The breakout kit of claim 20, wherein the second clamp comprises a band that wraps around a portion of the body and around the exterior of the fiber cable and includes a mechanism to tighten the band to clamp the exterior of the fiber cable to the body.

27. A telecommunications system comprising a breakout kit according to claim 20 coupled to a component of a telecommunications infrastructure.

* * * * *